United States Patent
Lee et al.

(10) Patent No.: US 9,843,772 B2
(45) Date of Patent: Dec. 12, 2017

(54) METHOD FOR PROVIDING TELEPRESENCE USING AVATARS, AND SYSTEM AND COMPUTER-READABLE RECORDING MEDIUM USING THE SAME

(71) Applicants: Korea Advanced Institute of Science and Technology, Daejeon (KR); Center of Human-centered Interaction for Coexistence, Seoul (KR)

(72) Inventors: Sung Hee Lee, Daejeon (KR); Bum Jae You, Seoul (KR)

(73) Assignees: Korea Advanced Institute Of Science And Technology, Daejeon (KR); Center Of Human-Centered Interaction For Coexistence, Seoul (KR)

( * ) Notice: Subject to any disclaimer, the term of this patent is extended or adjusted under 35 U.S.C. 154(b) by 102 days.

(21) Appl. No.: 14/955,013

(22) Filed: Nov. 30, 2015

(65) Prior Publication Data
US 2016/0205352 A1    Jul. 14, 2016

(30) Foreign Application Priority Data
Jan. 9, 2015  (KR) .......................... 10-2015-0003706

(51) Int. Cl.
| | |
|---|---|
| *H04N 7/15* | (2006.01) |
| *G06K 9/00* | (2006.01) |
| *G06Q 10/10* | (2012.01) |
| *G06K 9/62* | (2006.01) |

(52) U.S. Cl.
CPC ......... *H04N 7/157* (2013.01); *G06K 9/00335* (2013.01); *G06K 9/00362* (2013.01); *G06Q 10/10* (2013.01); *G06K 2009/6213* (2013.01)

(58) Field of Classification Search
CPC combination set(s) only.
See application file for complete search history.

(56) References Cited

U.S. PATENT DOCUMENTS

| | | | |
|---|---|---|---|
| 5,736,982 A | 4/1998 | Suzuki et al. | |
| 7,106,358 B2 * | 9/2006 | Valliath ................... | H04N 7/147 348/14.01 |

(Continued)

FOREIGN PATENT DOCUMENTS

| | | |
|---|---|---|
| KR | 10-2005-0116156 | 12/2005 |
| KR | 10-2010-0084597 | 7/2010 |
| KR | 10-2011-0066298 | 6/2011 |

*Primary Examiner* — Duc Nguyen
*Assistant Examiner* — Assad Mohammed
(74) *Attorney, Agent, or Firm* — Husch Blackwell LLP (57) ABSTRACT

A method for providing telepresence by employing avatars is provided. The method includes steps of: (a) a corresponding location searching part determining a location in a first space where an avatar Y' corresponding to a human Y in a second space will be placed, if a change of a location of the human Y in the second space is detected from an initial state, by referring to (i) information on the first space and the second space and (ii) information on locations of the humans X and Y, and the avatar X' in the first and the second spaces; and (b) an avatar motion creating part creating a motion of the avatar Y' by referring to information on the determined location where the avatar Y' will be placed.

11 Claims, 4 Drawing Sheets

(56) References Cited

U.S. PATENT DOCUMENTS

| | | | |
|---|---|---|---|
| 2004/0189701 A1* | 9/2004 | Badt, Jr. | G06Q 10/10 715/753 |
| 2008/0082311 A1 | 4/2008 | Meijer et al. | |
| 2010/0197395 A1* | 8/2010 | Geiss | G06T 7/251 463/31 |
| 2012/0293506 A1* | 11/2012 | Vertucci | G06N 3/04 345/419 |
| 2013/0196759 A1* | 8/2013 | Kim | A63F 13/06 463/31 |
| 2015/0016777 A1* | 1/2015 | Abovitz | G02B 27/225 385/37 |
| 2015/0035750 A1* | 2/2015 | Bailey | G06F 3/0346 345/158 |
| 2015/0215581 A1* | 7/2015 | Barzuza | G06T 19/006 348/14.1 |
| 2015/0302429 A1* | 10/2015 | Mehra | G06Q 10/063 705/7.29 |
| 2015/0341541 A1* | 11/2015 | Naik | H04N 5/23206 348/207.11 |

* cited by examiner

METHOD FOR PROVIDING TELEPRESENCE USING AVATARS, AND SYSTEM AND COMPUTER-READABLE RECORDING MEDIUM USING THE SAME

CROSS REFERENCE TO RELATED APPLICATION

This application claims priority to and incorporates herein by reference all disclosure in Korean Patent Application No. 10-2015-0003706 filed Jan. 9, 2015.

FIELD OF THE INVENTION

The present invention relates to a method for providing telepresence by using avatars and a system and a computer-readable recording media using the same; and more particularly, to a technology for changing a motion adaptively by recognizing information on space and considering information on a location, an orientation, etc. of an object in the space to implement an effect of enabling a first person in a first space and a second person in a second space to gather in the first space through an avatar of the second person and/or gather in the second space through an avatar of the first person.

BACKGROUND OF THE INVENTION

A telepresence system by using avatars may be applied to a technology for allowing participants at distant places to feel as if they were at one place.

Accordingly, the technology allows people who are far away from each other to feel as if they were together at his or her present space by using avatars.

Therefore, technologies relating to virtual video calls by using avatars have been disclosed in Korean Laid-Open Publication No. 2005-7017989, U.S. Pat. No. 5,736,982 and United States Laid-Open Publication No. 2008-0082311.

According to the Korean Laid-Open Publication No. 2005-7017989, a technology for allowing a user to control a pose of his or her avatar easily by using a keyboard, mouse, facial expression, motion, etc. is disclosed. Besides, according to the U.S. Pat. No. 5,736,982, a technology for identifying an intention of a user who accesses a virtual world to talk with another avatar (user) by using information on the user's gaze and his or her avatar's location, and then connecting a speech channel between the two users is disclosed. According to the U.S. Laid-Open Publication No. 2008-0082311, a technology for allowing a user to invite a person at a remote place in a present virtual space and play a computer game or watch a TV together with the person is disclosed.

Accordingly, the conventional technologies can control avatars and mutually connecting them to each other but they have a problem in that they do not control their motions adaptively in an environment where the users can co-exist at their own spaces and take their poses naturally.

Therefore, the inventor came to develop a technology for controlling a motion of a user's avatar adaptively even in another person's virtual space.

SUMMARY OF THE INVENTION

It is an object of the present invention to solve all the aforementioned problems.

It is another object of the present invention to allow a human in a present space and an avatar in the present space corresponding to another human in a remote place to naturally communicate with each other adaptively.

It is still another object of the present invention to naturally output an avatar's motion corresponding to a human's motion by reflecting characteristics of objects in the present space and the remote place.

In accordance with one aspect of the present invention, there is provided a telepresence system by using avatars, including: a corresponding location searching part for determining a location in a first space as a present space where an avatar Y' corresponding to a human Y in a second space as a remote place will be placed, if a change of a location of the human Y in the second space is detected from an initial state in which an initial location of a human X in the first space, that of the human Y in the second space, that of the avatar Y' in the first space corresponding to the human Y, and that of an avatar X' in the second space corresponding to the human X are determined, by referring to (i) information on the first space and the second space and (ii) information on locations of the humans X and Y, and the avatar X' in the first and the second spaces; and an avatar motion creating part for creating a motion of the avatar Y' by referring to information on the determined location where the avatar Y' will be placed.

In accordance with another aspect of the present invention, there is provided a method for providing telepresence by employing avatars, including steps of: (a) a corresponding location searching part determining a location in a first space as a present space where an avatar Y' corresponding to a human Y in a second space as a remote place will be placed, if a change of a location of the human Y in the second space is detected from an initial state in which an initial location of a human X in the first space, that of the human Y in the second space, that of the avatar Y' in the first space corresponding to the human Y, and that of an avatar X' in the second space corresponding to the human X are determined, by referring to (i) information on the first space and the second space and (ii) information on locations of the humans X and Y, and the avatar X' in the first and the second spaces; and (b) an avatar motion creating part creating a motion of the avatar Y' by referring to information on the determined location where the avatar Y' will be placed.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
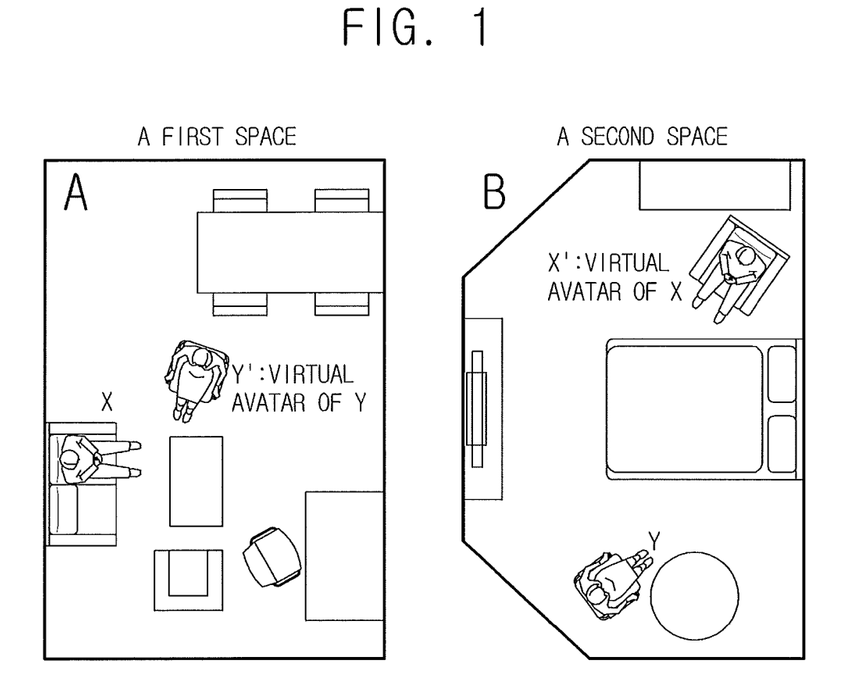
FIG. 1 is a concept diagram of a telepresence system in accordance with one example embodiment of the present invention.

To allow those skilled in the art to the present invention to carry out easily, the example embodiments of the present invention by referring to attached diagrams will be explained in detail as follows:

FIG. 1 is a concept diagram under a telepresence system by using avatars in accordance with one example embodiment of the present invention.

By referring to the telepresence system of FIG. 1, an initial state where there are a human X in a first space as a present space, a human Y in a second space as a remote place, an avatar Y' (corresponding to the human Y) in the first space, and an avatar X' (corresponding to the human X) in the second space is represented. A method for determining the initial state will be explained later.

Under such a situation, if a change of a location of the human Y in the second space is detected, a corresponding location searching part 240 to be explained below may determine a location where the avatar Y' will be placed in the first space by referring to (i) information on the first space and the second space and (ii) information on locations of the humans X and Y and the avatar X' in the first and the second spaces. Herein, the corresponding location searching part 240 may also determine the location where the avatar Y' will be placed in the first space by additionally referring to (iii) information on gazes of the humans X and Y in the first and the second spaces. Besides, an avatar motion creating part 250 to be explained later may create a motion of the avatar Y' by referring to information on the location where the avatar Y' will be placed.

Hereinabove, only the avatar Y' was mentioned in detail, but it is natural that this could be applied equally even to the avatar X'. Further, the first space was mentioned as a present space and the second space was mentioned as a remote space but the first space could be the remote place and the second space could be the present space. However, for convenience, only one space will be explained.

For reference, the avatars X' and Y' may be virtual avatars visualized through head mounted displays (HMDs) worn by the humans X and Y and other augmented reality (AR) displays or physical avatars such as robots. At the time, appearances of the avatars could resemble humans at the remote places or be expressed as other figures such as animals or characters.

In addition, the present invention assumes a situation under which not only the structures of the present space and the remote place but also shapes, quantity, types, and layouts of objects such as furniture existing in the respective spaces could be different.

For example, if the human Y who stood in front of a door of the remote place approaches, and sits on, a chair at a different location in the remote place, the human Y at the remote place is allowed to be adapted to an environment of the present space by making the avatar Y' used to represent the human Y take an action of standing in front of a door of the present space and then approaching a chair at a proper location in the present space. This will be explained later in more detail.

Furthermore, as explained above, as it was assumed that the structures of the present space and the remote place and the shapes, the quantities, the types, and the layouts of the objects in the present space and the remote place could be different, there could be a variety of routes of reaching the destination for the avatar Y' in the present space according to the change of the motion of the human Y in the remote place.

For one example, even though the human Y at the remote place walked in a straight line to move to the chair from the front of the door, the avatar Y' at the present space which has a structurally different environment from the remote place may take an action of turning around or getting over an obstacle to go to the chair from the front of the door. This will be also explained later in detail.

Figure 2:
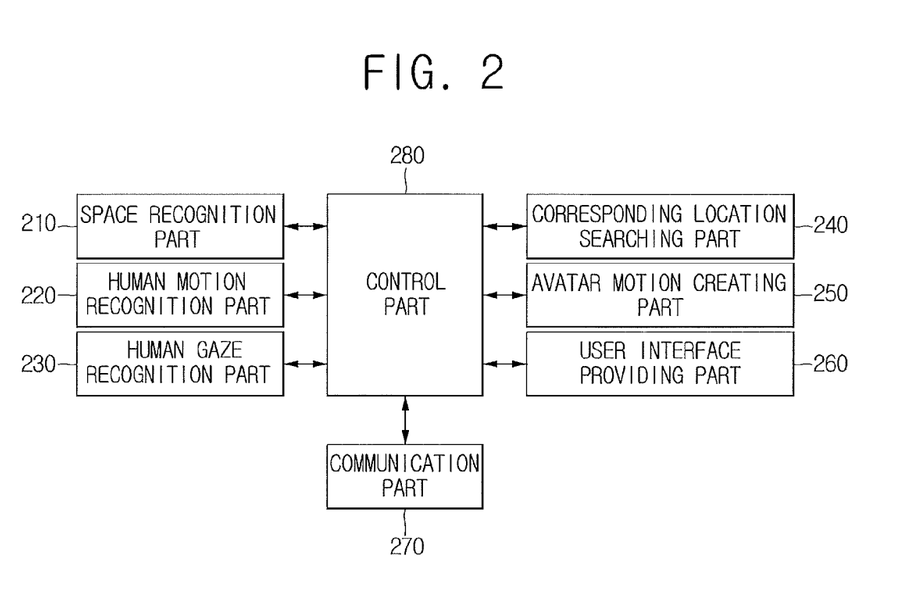
FIG. 2 is a whole configuration of the telepresence system in accordance with one example embodiment of the present invention.

A whole configuration of the telepresence system by using avatars in the present invention based on the aforementioned concepts is illustrated in FIG. 2.

As shown in FIG. 2, a telepresence system 200 by using avatars in the present invention includes a space recognition part 210, a human motion recognition part 220, and a human gaze recognition part 230 for acquiring a variety of pieces of information to recognize actual conditions of a human and an environment, a corresponding location searching part 240 for searching a corresponding location, i.e., an optimal location where an avatar will be placed in the present space, an avatar motion creating part 250 for receiving a value from the corresponding location searching part 240 to map a motion of the human Y in the remote place to the avatar Y' in the present space, a user interface providing part 260 for allowing a user to determine whether an estimated destination is appropriate or not, a communication part 270, and a control part 280. For reference, the telepresence system 200 in accordance with the present invention necessarily include the corresponding location searching part 240, the avatar motion creating part 250, the communication part 270, and the control part 280. Meanwhile, the space recognition part 210, the human motion recognition part 220, the human gaze recognition part 230, and the user interface providing part 260, if necessary, may be included in the telepresence system 200 in accordance with the present invention or separately in another system.

The space recognition part 210 measures data by means of various types of sensors, including an image sensor, a depth sensor, a laser sensor, etc. and acquires information on types of objects such as furniture (e.g., a chair, a table, a bed, etc.) and space information on locations and orientations of the objects (i.e., directions on which the objects are placed, etc.).

At the time, the space information may include information on types, locations, and orientations of the objects granted to the patches, which will be explained later.

To acquire information on a location of a human, the human motion recognition part 220, moreover, could measure data with respect to a human motion by means of a wearable sensor such as an image sensor, a depth sensor, or an inertial measurement unit (IMU) and acquire information on a location and a motion of the human as a function of time through the measured sensor data.

Besides, the human gaze recognition part 230 acquires information on an object gazed by a human and a gaze point through a variety of sensor data with which gaze measurements are available.

The corresponding location searching part 240 calculates an appropriate location where the avatar Y' in the present space corresponding to that of the human Y in the remote place will be placed or a changing location of the avatar Y' in the present space, if the human Y in the remote place is changed his or her location within the remote place, based on the acquired information on the space, the location, the motion, and the gaze.

In other words, it calculates an optimal corresponding location in the present space where the avatar Y' will be placed according to the movement of the human Y by receiving 1) information on the remote place and the present space, 2) information on locations of humans in the remote and the present spaces and/or 3) gaze information and then estimating a destination where the human in the remote place intends to approach.

At the time, the corresponding location searching part 240 may divide spaces and surfaces of objects into virtual patches, in which case the estimation of the destination and the calculation of the optimal corresponding location may be performed in a unit of patch.

The patches are created by dividing the spaces in a unit of plane. Herein, a curved surface may be divided into multiple planes. By determining a minimum value (e.g., 0.1 1 m$^2$) and a maximum value (e.g., 1 m$^2$) of an area of each patch to allow the patches to express a location of a human properly, a plane not more than the minimum value may be controlled not to be included in the patch and that not less than the maximum value may be controlled to be divided into multiple patches.

The corresponding location searching part 240 gives and stores an ID of an object and geometrical information (including sizes, heights, and directions of normal vectors) with respect to each patch according to space information. Besides, each patch has information on a location and a principle direction in a space according to the space information. This will be stated by referring to FIG. 3.

Figure 3:
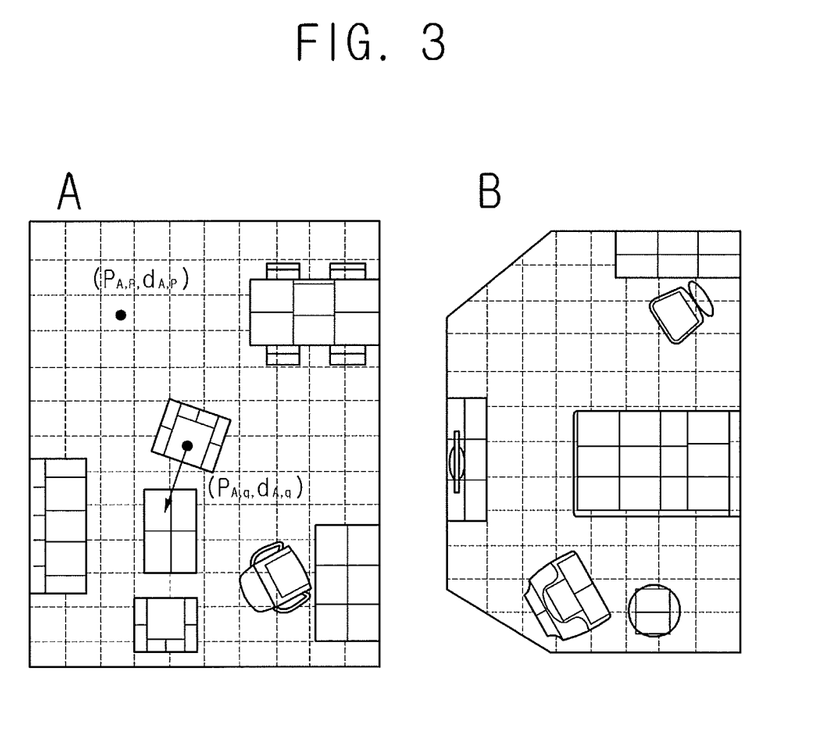
FIG. 3 represents a state of dividing spaces into patches to search corresponding locations under the telepresence system in accordance with the present invention.

By referring to FIG. 3, if $s_{A,i}$ is a patch i corresponding to a space A, $s_{A,p}$ corresponds with a patch P which corresponds to the space A and $s_{A,q}$ corresponds with a patch Q which corresponds to the space A.

On the assumption that a location of $s_{A,i}$ is $p_{A,i}$ and a principal direction thereof is $d_{A,i}$, if the corresponding patch has a principal direction such as a chair, the principal direction $d_{A,i}$ is designated as a direction taken principally by a human and if the corresponding patch has no principal direction such as a floor, the principal direction $d_{A,i}$ is designated as "undefined."

As shown in FIG. 3, a principal direction $d_{A,q}$ of a patch $s_{A,q}$ corresponding to a chair is represented as an arrow head and a principal direction $d_{A,p}$ of a patch $s_{A,p}$ corresponding to a floor is undefined, which means that there is no corresponding arrow head.

Meanwhile, the corresponding location searching part 240 calculates an optimal corresponding location, i.e., a patch and a direction of the patch where an avatar should be placed at an initial state when the avatar is initially operated as shown below. This will be explained in more detail by referring to FIG. 4.

Figure 4:
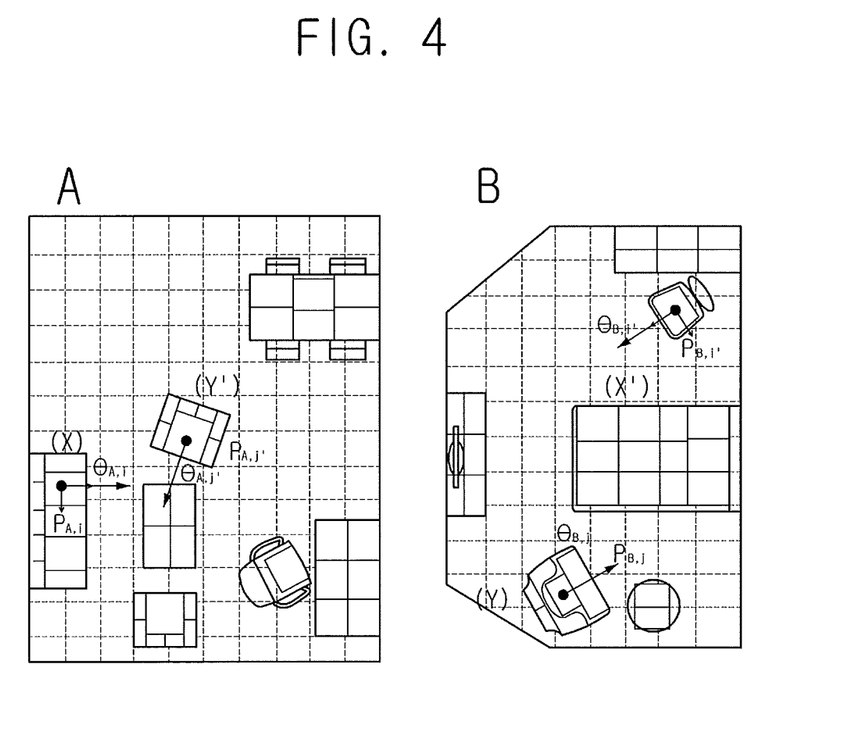
FIG. 4 illustrates a state of information assigned to individual patches.

By referring to FIG. 4, on the assumption that a location and an orientation of the human X in the present space A are $p_{A,i}$ and $\theta_{A,i}$ and those of the human Y in the remote place are $p_{B,j}$ and $\theta_{B,j}$, an optimal patch $s_{A,j'}$ and an optimal orientation $\theta_{A,j'}$ of the avatar Y' (corresponding to the human Y in the remote place) to be placed in the present space are determined such that a degree of intrinsic similarity and a degree of spatial proximity reach maximum values.

The degree of intrinsic similarity represents a degree of similarity with respect to (i) information on types of objects (e.g., a chair, a table) in the patches and (ii) geometrical characteristics (e.g., normal vectors, patch sizes, heights, and aspect ratios) of the patches.

The degree of spatial proximity may be determined as a function which increases when $p_{A,i}$ and $p_{A,j'}$ are closer to a certain distance $\alpha$ (determined as a proper distance that people can talk with each other, e.g., 1 m) and $\theta_{A,j'q}$ (i.e., a difference between $\theta_{A,j'}$ and $\theta_{A,i}$) is closer to 180 degrees to make a human and an avatar face each other. For example, information on the degree of spatial proximity may be determined as a function shown below.

$$(p_{A,j'}, p_{A,i}, \theta_{A,j'q}) = \exp(-\lambda_1(\|p_{A,j'} p_{A,i}\| - \alpha) - \lambda_2|\theta_{A,j'q} - 180|)$$

where $\lambda_i$ ($\geq 0$) is a weighting factor which controls the influence of each term.

The initial optimal corresponding location may be determined as a location with high degrees of intrinsic similarity and spatial proximity. For example, the location may be determined as a location where the following fitness function is maximized:

$$\max\{(1-w_2) \cdot \text{intrinsic\_similarity}(s_{A,j'}, s_{B,j}) + w_2 \cdot \text{spatial\_proximity}(p_{A,j'}, p_{A,i}, \theta_{A,j'q})\}$$

where $w_2$ ($\geq 0$) is a weighting factor which controls the influence of the intrinsic similarity and the spatial proximity.

Similarly, a location $p_{B,i'}$ and orientation $\theta_{B,i'}$ of the avatar X' in the remote place could be obtained by the aforementioned method.

Besides, it could be also assumed that, if the present and the remote places are divided into multiple patches, the corresponding location searching part 240 allows the avatar Y' in the present space to have a direction of 180 degrees (or near 180 degrees) from a direction of the human X and have a location within a predetermined distance from the human X to thereby be placed in a patch with a high degree of appropriateness for a human to be located in the present space, and allows the avatar X' in the remote place to have a direction of 180 degrees (or near 180 degrees) from the a direction of the human Y and have a location within a preset distance from the human Y to thereby be placed in a patch with a high degree of appropriateness for a human to be located in the remote place.

By the afore-stated method, the initial states of the locations of the human X and the avatar Y' in the present space and the human Y and the avatar X' in the remote place would be determined. As shortly mentioned above, the states in FIG. 1 are examples of the initial states of the human X and the avatar Y' in the present space and the human Y and the avatar X' in the remote place.

Meanwhile, it is assumed that the human Y in the remote place changes his or her location from the initial state of the location of the human Y. In the case, the corresponding location searching part 240 may calculate an appropriate location where the avatar Y' in the present space will be placed when it detects the changed location of the human Y in the remote place.

First of all, to calculate the appropriate location where the avatar Y' in the present space will be placed, a degree of similarity between patches of the present space and those of the remote place should be calculated.

In other words, the degree of similarity between patches of the present space and those of the remote place is obtained by calculating a degree of intrinsic similarity and a degree of spatial similarity.

The degree of spatial similarity is acquired by referring to (i) information on a relative location and a relative direction between the human X and the avatar Y' in the first space and (ii) information on a relative location and a relative direction between the human Y and the avatar X' in the second space.

First of all, on the assumption that a human and an avatar are placed in two patches $s_{A,i}$ and $s_{A,j}$ in the space A in FIG. 4 with specified orientations $\theta_{A,i}$ and $\theta_{A,j}$, respectively (arrow heads in FIG. 4), $\theta_{A,i}$ may be equal to or different from $d_{A,i}$, or may be designated as undefined as the case may be.

At the time, a coordinate system may be set based on $p_{A,i}$ and $\theta_{A,i}$ and a relative location of $s_{A,j}$ in reference to the set coordinate system is defined as $p_{A,j'i}$ and a difference between the orientations $\theta_{A,i}$ and $\theta_{A,j}$, in reference to the set coordinate system is defined as $\theta_{A,j'i}$ ($=\theta_{A,j}-\theta_{A,i}$). If either of $\theta_{A,i}$ and $\theta_{A,j}$, is undefined, $\theta_{A,j'i}$ may be determined as undefined. $s_{B,ji'}$ and $\theta_{B,ji'}$ may be determined in the space B in the similar manner.

Accordingly, a degree of spatial similarity between $s_{A,j'}$ and $s_{B,j}$ with respect to reference patches $s_{A,i}$ and $s_{B,i'}$ is determined as a function which increases as the differences between $p_{A,j'i}$ and $p_{B,ji'}$ and between $\theta_{A,j'i}$ and $\theta_{B,ji'}$, become smaller. For example, the degree of spatial similarity may be calculated as follows:

$$\text{spatial\_similarity}=\exp(-\lambda_1\|p_{A,j'i}-p_{B,ji'}\|-\lambda_2|\theta_{A,j'i}-\theta_{B,ji'}|)$$

where $\lambda_i$ ($\geq 0$) is a weighting factor which controls the influence of each term.

At the time, if both $\theta_{A,j'i}$ and $\theta_{B,ji'}$ are undefined, $\theta_{A,j'i}-\theta_{B,ji'}$ may be determined as 0 and if either of them is undefined, a sufficiently large value may be given to $|\theta_{A,j'i}-\theta_{B,ji'}|$.

Next, a method of the corresponding location searching part 240 calculating an appropriate location where the avatar Y' in the present space will be placed when a change of a location of the human Y in the remote place is detected will be explained in detail.

If detecting a change of location of the human Y in the remote place, the corresponding location searching part 240 estimates a location which the human Y (moving) in the remote place intends to reach, i.e., a patch ($s_{B,j}$) as a destination.

To estimate the patch ($s_{B,j}$) as the destination, the corresponding location searching part 240 may refer to information on probabilities of the human Y reaching the respective patches and then determine a patch with the highest probability as the patch ($s_{B,j}$), i.e., the destination. The probabilities $P_{tp}$ ($s_{B,k}$) (k=1, 2, . . . ) of the human Y reaching the respective patches as the destination, i.e., $s_{B,k}$ (k=1, 2, . . . ), may be obtained as shown below. Herein, the probabilities $P_{tp}$ ($s_{B,k}$) (k=1, 2, . . . ) of the human Y reaching the respective patches as the destination means probabilities of the respective patches being determined as the destination which the human Y intends to reach.

$$P_{tp}(s_{B,k})=\text{gaze\_term}*\text{affordance\_prior\_term}*\text{humanal\_prior\_term}$$

where the gaze term is a function which increases as a cumulative value (an integral value) of probabilities of gazing at a patch $s_{B,k}$ during a time section (e.g., one second) from the past to the present increases.

Furthermore, the affordance prior term is a function for evaluating degrees of appropriateness of a human to be located by referring to types of objects to which the patches correspond and geometrical characteristics of the patches (e.g., heights, normal vector directions). For instance, the types of objects such as a chair, or a floor where the human is easy to be located have relatively higher values than those of objects such as a table or a desk. Further, if a normal direction of an object is more distant from the opposite direction of gravity, a relatively lower value may be assigned. Additionally, the affordance prior term has a smaller value when a height of an object is higher than a reference height difficult for the human to be located (e.g., 1.5 meters from the floor) or when an empty space on a patch is lower than a certain reference height (e.g., 1 meter).

In addition, the personal prior term is a function which increases as a frequency of a patch $s_{B,k}$ being the destination actually reached by the human Y increases.

Accordingly, $s_{B,j}$ could be selected as a patch with the largest $P_{tp}$ among the patches in the space B (k=1, 2, . . . ), and it could be explained under the following formula:

$$s_{B,j}=\arg\max_k P_{tp}(s_{B,k})$$

Meanwhile, the corresponding location searching part 240 may deliver information on $s_{B,j}$ as a patch with the largest $P_{tp}$ as shown above through the user interface providing part 260 of the human Y moving in the remote place. At the time, the user interface providing part 260 may include an AR display such as an HMD and the human Y may give feedback about whether the estimation result, i.e., the information on $s_{B,j}$, is appropriate or not by using the user interface provided by the user interface providing part 260. For example, if $s_{B,j}$ is not a destination the human Y intends to move and reach, the human Y may give a negative feedback through the user interface providing part 260 in a meaning of wrong estimation. Then, the corresponding location searching part 240 may estimate another destination candidate (until the human Y gives a positive feedback) through an iterative process, i.e., through a course of repeatedly delivering information on a patch with a next highest probability to the user interface providing part 260 until a positive feedback is acquired from the human Y.

Next, on assumption that the estimated destination patch for the human Y moving in the remote place is designated as $s_{B,j}$, the location and the orientation of the avatar X' in the remote place are $p_{B,i'}$ and $\theta_{B,i'}$, and the location and the orientation of the human X in the present space are $p_{A,i}$ and $\theta_{A,i}$, an optimal patch $s_{A,j'}$ and an optimal orientation $\theta_{A,j'}$ of the avatar Y' (i.e., the avatar for the human Y in the remote place) can be calculated to thereby acquire an optimal corresponding location for the avatar Y'.

$\theta_{B,j}$ is determined as $d_{B,j}$ (a principal direction of $s_{B,j}$) and if $d_{B,j}$ is undefined, even $\theta_{B,j}$ is designated as undefined.

$s_{A,j'}$ and $\theta_{A,j'}$ are selected such that the degree of intrinsic similarity and the degree of spatial similarity as specified above become maximums.

For example, $s_{A,j'}$ and $\theta_{A,j'}$ are selected such that the following fitness function becomes maximum:

$$\max\{(1-w_1)\cdot\text{intrinsic\_similarity}(s_{A,j'},s_{B,j})+w_1\cdot\text{spatial\_similarity}(p_{A,j'i},p_{B,ji'},\theta_{A,j'i},\theta_{B,ji'})\}$$

$w_1$ ($\geq 0$) as a scalar is a weighting factor which controls degrees of importance with respect to the intrinsic similarity and the spatial similarity.

For reference, by the aforementioned optimization course, if $\theta_{B,j}$ is undefined, a patch whose $\theta_{A,j'}$ is undefined has a higher probability to be selected as $s_{A,j'}$ and if $\theta_{b,j}$ is defined, a patch whose $\theta_{A,j'}$ is defined has a higher probability to be selected as $s_{A,j'}$.

Meanwhile, the avatar motion creating part 250 may create a motion of the avatar Y' by referring to information on the estimated destination where the avatar Y' will arrive. To do this, the avatar motion creating part 250 may be operated all the time to thereby create the movement of the avatar in the present space according to the movement of the human in the remote place.

The avatar motion creating part 250 outputs information on a shape of an avatar which takes a pose after receiving and analyzing at least some of 1) an output value of the corresponding location searching part 240, 2) information on a human motion, a gaze and a space measured by recognition sensors (i.e., a human motion recognition part, a human gaze recognition part, and a space recognition part) in the remote place, 3) information on a human motion, a gaze and a space measured by recognition sensors in the present space, and 4) information on a basic shape (including body size, appearance, etc.) of the avatar.

When the corresponding location searching part 240 determines the destination where the avatar will be placed, the avatar motion creating part 250 searches an optimal route to make the avatar avoid interpenetration (i.e., collision) and creates a moving motion of the avatar.

There may be a lot of appropriate algorithms for searching a route and creating a moving motion.

At the time, the motion of the avatar may be created by referring to a type of the motion (e.g., sitting, standing, lying, or gesturing) of the human in the remote place. Due to a difference in shape between the human and the avatar and a difference in environment between the remote place and the present space, if a pose (e.g., angles of respective joints) of the human in the remote place is applied to the avatar in the present space as it is, the interpenetration with the environment (e.g., furniture, etc.) may occur. Therefore, the orientation of the avatar is determined to avoid the interpenetration with the environment while the orientation of the human in the remote place is kept to the maximum.

For example, a revised pose of the avatar may be determined by solving an optimization problem as shown below.

$$\min\{(1-w_3)\cdot\text{pose\_difference}+w_3\cdot\text{penetration\_penalty}\}$$

where pose_difference means a value which becomes larger when the difference in poses between the human and the avatar becomes larger and penetration_penalty means a value which becomes larger when a portion of the avatar penetrating into the environment becomes more. Of course, explanation on the algorithm for calculating a degree of penetration between two objects is omitted because there are many such algorithms.

In accordance with the present invention, if a corresponding location searching part displays a new destination where an avatar will be placed, the present invention has an effect of the avatar searching an optimal route to avoid interpenetration with the environment and then creating its moving motion.

The present invention also has an effect of creating a motion of an avatar in the present space corresponding to a type of a motion of a human in a remote place.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A telepresence system by using avatars, comprising:
a space recognition part including at least one sensor, said space recognition part acquiring information regarding at least a first space, which is a present space, and a second space, which is a remote space;
a human motion recognition part including at least one sensor, said human motion recognition part acquiring information on locations of a human X in the first space and a human Y in the second space;
(A) a corresponding location searching part for determining a location in the first space where an avatar Y', by referring to (i) information on the first space and the second space, (ii) information on locations of the humans X and Y and an avatar X' in the second space, and (iii) information on gazes of the humans X and Y in the first and second spaces;
wherein the avatar Y' corresponds to the human Y, and the avatar X' corresponds to the human X,
wherein the corresponding location searching part estimates the destination in a unit of patch by dividing at least part of the first and the second spaces into patches, and determines the location where the avatar Y' will be placed,
wherein the corresponding location searching part determines the location in the first space where the avatar Y' will be placed by selecting a location that has the highest degree acquired by referring to (i) information on a degree of intrinsic similarity calculated by using at least some of information on types of objects corresponding to the patches included in the first and the second spaces and at least some of information on geometrical characteristics of the patches; and (ii) information on a degree of spatial similarity calculated by using information on a relative location and a relative direction between the human X and the avatar Y' in the first space and those between the human Y and the avatar X' in the second space,
wherein the corresponding location searching part determines a destination in the second space where the human Y intends to reach from the initial state by referring to at least part of (1) information on a function which increases as cumulative values of respective probabilities of gazing at the respective patches during a certain time section increase, (2) information on a function for evaluating degrees of appropriateness of locations for the human Y to be located by considering types of objects to which the respective patches correspond and geometrical characteristics of the respective patches, and (3) information on a function which increases as frequencies of the respective patches being the destination actually reached by the human Y become higher; and (B) an avatar motion creating part for creating a motion of the avatar Y' by referring to information on the determined location where the avatar Y' will be placed;

wherein the avatar motion creating part creates a motion of the avatar Y' by searching a route to avoid interpenetration in the first space, and wherein the avatar motion creating part creates the motion of the avatar Y' by referring to (i) a degree of difference between a pose of the human Y and that of the avatar Y' and (ii) a degree of penetration of the avatar Y' into an environment of the first space.

2. The system of claim 1, wherein the first and the second spaces are divided into patches in a unit of plane and a plane not more than a predetermined minimum area is excluded from the patch and a plane not less than a predetermined maximum area is subdivided into multiple patches.

3. The system of claim 1, wherein the information on the geometrical characteristics of the patches includes at least some of sizes, heights, normal vectors, and aspect ratios thereof.

4. The system of claim 1, wherein the corresponding location searching part provides the human Y with information on the determined destination and offers user interface capable of receiving feedback from the human Y about whether the determined destination is appropriate.

5. The system of claim 1, further comprising: a human gaze recognition part for acquiring information on gazes of the humans X and Y in the first and the second spaces.

6. The system of claim 1, wherein the space recognition part recognizes at least one of types, locations, and orientations of objects existing in the first and the second spaces.

7. The system of claim 1, wherein, if the human X exists in a specified direction at a specified location of the first space and the human Y exists in a specific direction at a specific location of the second space, the corresponding location searching part allows the avatar Y' to be placed in the first space to have a direction of 180 degrees (or near 180 degrees) from a direction of the human X and have a location within a predetermined distance from the human X and allows the avatar X' to be placed in the second space to have a direction of 180 degrees (or near 180 degrees) from a direction of the human Y and have a location within a preset distance from the human Y.

8. The system of claim 7, wherein, if the first and the second spaces are divided into multiple patches, the corresponding location searching part allows the avatar Y' to be placed in a patch with a high degree of appropriateness for a human to be located in the first space while having the direction of 180 degrees (or near 180 degrees) from a direction of the human X and having a location within the predetermined distance from the human X and allows the avatar X' to be placed in a patch with a high degree of appropriateness for a human to be located in the second space while having the direction of 180 degrees (or near 180 degrees) from a direction of the human Y and having a location within the preset distance from the human Y.

9. A method for providing telepresence by employing avatars, comprising steps of:
(a) acquiring, via a space recognition part including at least one sensor, information regarding at least a first space, which is a present space, and a second space, which is a remote space;
(b) acquiring, via a human motion recognition part including at least one sensor, information on locations of a human X in the first space and a human Y in the second space;
(c) determining, via a corresponding location searching part, a location in the first space where an avatar Y', by referring to (i) information on the first space and the second space, (ii) information on locations of the humans X and Y and an avatar X' in the second space, and (iii) information on gazes of the humans X and Y in the first and second spaces;

wherein the avatar Y' corresponds to the human Y, and the avatar X' corresponds to the human X, wherein the corresponding location searching part estimates the destination in a unit of patch by dividing at least part of the first and the second spaces into patches, and determines the location where the avatar Y' will be placed, wherein the corresponding location searching part determines the location in the first space where the avatar Y' will be placed by selecting a location that has the highest degree acquired by referring to (i) information on a degree of intrinsic similarity calculated by using at least some of information on types of objects corresponding to the patches included in the first and the second spaces and at least some of information on geometrical characteristics of the patches; and (ii) information on a degree of spatial similarity calculated by using information on a relative location and a relative direction between the human X and the avatar Y' in the first space and those between the human Y and the avatar X' in the second space, wherein the corresponding location searching part determines a destination in the second space where the human Y intends to reach from the initial state by referring to at least part of (1) information on a function which increases as cumulative values of respective probabilities of gazing at the respective patches during a certain time section increase, (2) information on a function for evaluating degrees of appropriateness of locations for the human Y to be located by considering types of objects to which the respective patches correspond and geometrical characteristics of the respective patches, and (3) information on a function which increases as frequencies of the respective patches being the destination actually reached by the human Y become higher; and (d) creating, via an avatar motion creating part, a motion of the avatar Y' by referring to information on the determined location where the avatar Y' will be placed;

wherein the avatar motion creating part creates a motion of the avatar Y' by searching a route to avoid interpenetration in the first space, and wherein the avatar motion creating part creates the motion of the avatar Y' by referring to (i) a degree of difference between a pose of the human Y and that of the avatar Y' and (ii) a degree of penetration of the avatar Y' into an environment of the first space.

10. The method of claim 9, wherein, at the step of (c), if the human X exists in a specified direction at a specified location of the first space and the human Y exists in a specific direction at a specific location of the second space, the avatar Y' is allowed to be placed in the first space to have a direction of 180 degrees (or near 180 degrees) from a direction of the human X and have a location within a predetermined distance from the human X and the avatar X' is allowed to be placed in the second space to have a direction of 180 degrees (or near 180 degrees) from a direction of the human Y and have a location within a preset distance from the human Y.

11. One or more non-transitory computer-readable recording media having stored thereon a computer program that, when executed by one or more processors, causes the one or more processors to perform acts including:
- a space recognition part including at least one sensor, said space recognition part acquiring information regarding at least a first space, which is a present space, and a second space, which is a remote space;
- a human motion recognition part including at least one sensor, said human motion recognition part acquiring information on locations of a human X in the first space and a human Y in the second space;
- (A) a corresponding location searching part for determining a location in the first space where an avatar Y', by referring to (i) information on the first space and the second space, (ii) information on locations of the humans X and Y and an avatar X' in the second space, and (iii) information on gazes of the humans X and Y in the first and second spaces;
- wherein the avatar Y' corresponds to the human Y, and the avatar X' corresponds to the human X,
- wherein the corresponding location searching part estimates the destination in a unit of patch by dividing at least part of the first and the second spaces into patches, and determines the location where the avatar Y' will be placed,
- wherein the corresponding location searching part determines the location in the first space where the avatar Y' will be placed by selecting a location that has the highest degree acquired by referring to (i) information on a degree of intrinsic similarity calculated by using at least some of information on types of objects corresponding to the patches included in the first and the second spaces and at least some of information on geometrical characteristics of the patches; and (ii) information on a degree of spatial similarity calculated by using information on a relative location and a relative direction between the human X and the avatar Y' in the first space and those between the human Y and the avatar X' in the second space,
- wherein the corresponding location searching part determines a destination in the second space where the human Y intends to reach from the initial state by referring to at least part of (1) information on a function which increases as cumulative values of respective probabilities of gazing at the respective patches during a certain time section increase, (2) information on a function for evaluating degrees of appropriateness of locations for the human Y to be located by considering types of objects to which the respective patches correspond and geometrical characteristics of the respective patches, and (3) information on a function which increases as frequencies of the respective patches being the destination actually reached by the human Y become higher; and
- (B) an avatar motion creating part for creating a motion of the avatar Y' by referring to information on the determined location where the avatar Y' will be placed;
- wherein the avatar motion creating part creates a motion of the avatar Y' by searching a route to avoid interpenetration in the first space, and
- wherein the avatar motion creating part creates the motion of the avatar Y' by referring to (i) a degree of difference between a pose of the human Y and that of the avatar Y' and (ii) a degree of penetration of the avatar Y' into an environment of the first space.

* * * * *